Patented Feb. 1, 1944

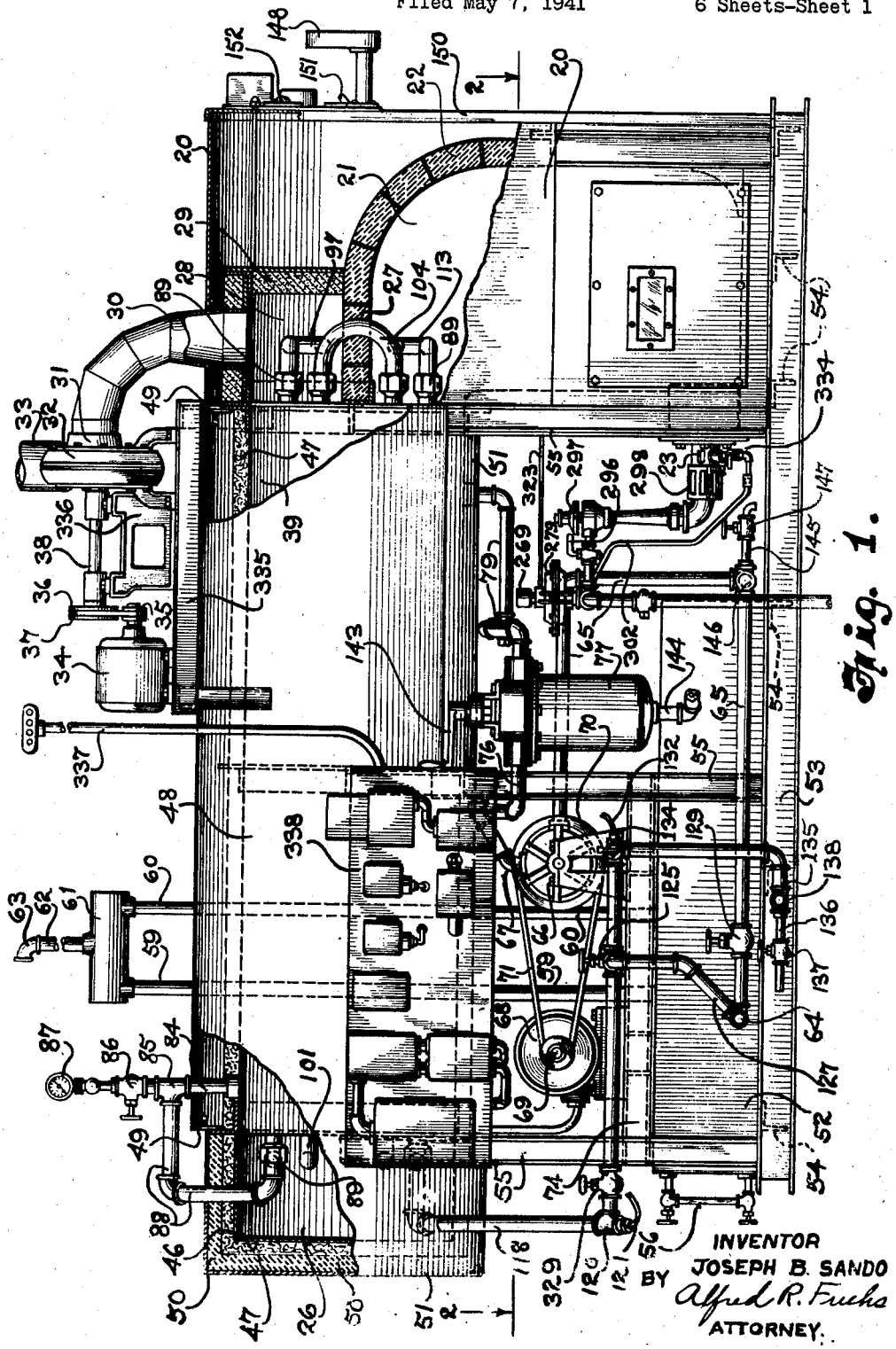

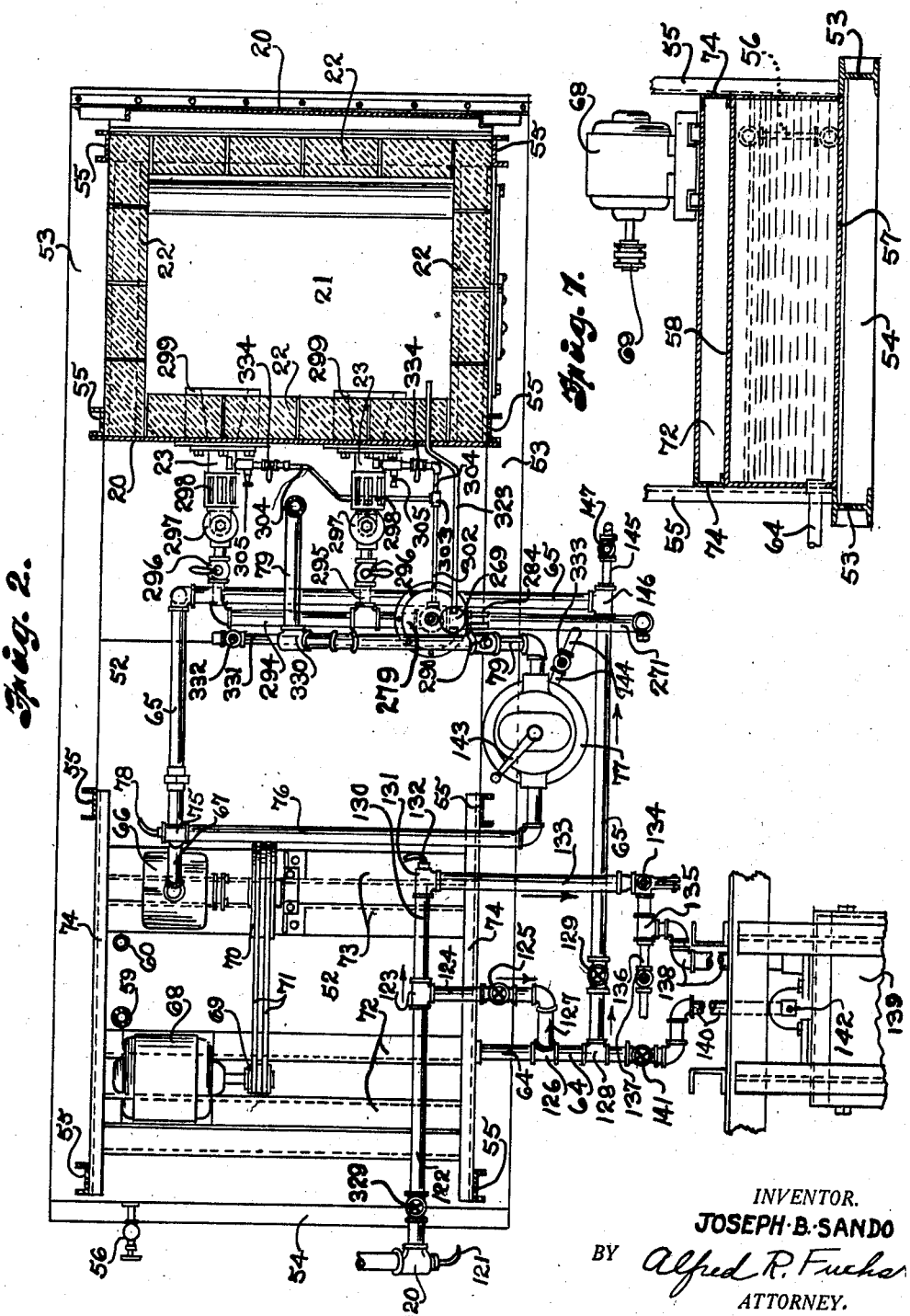

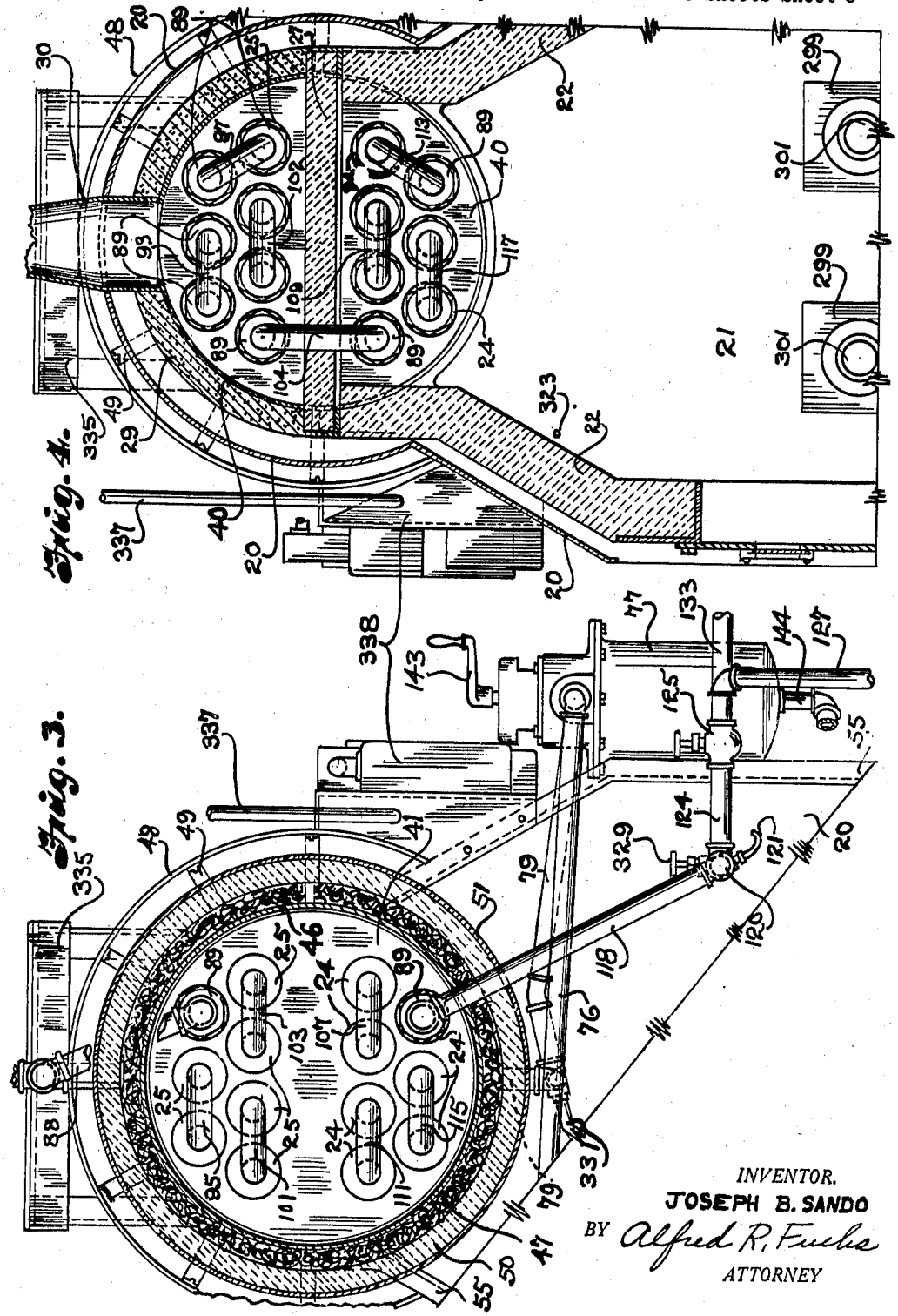

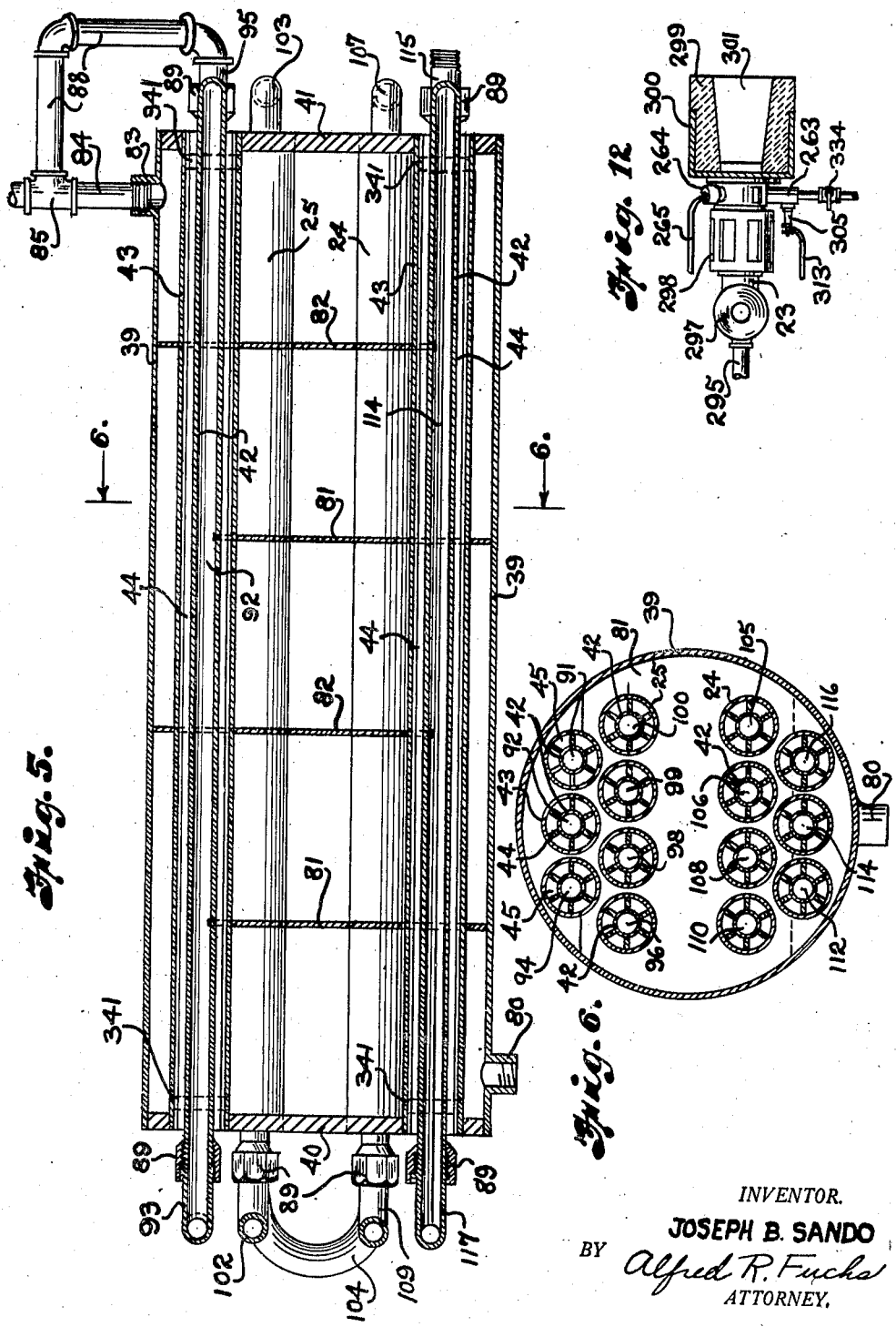

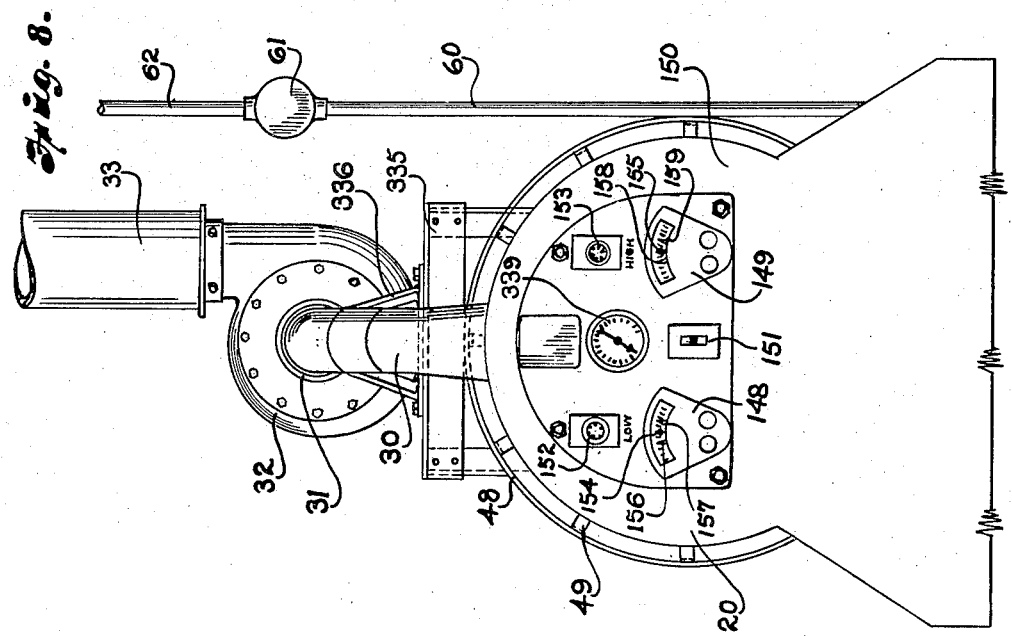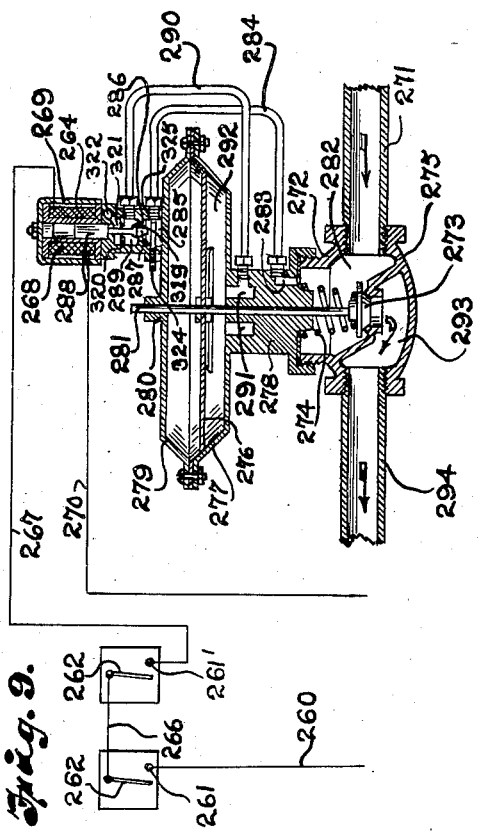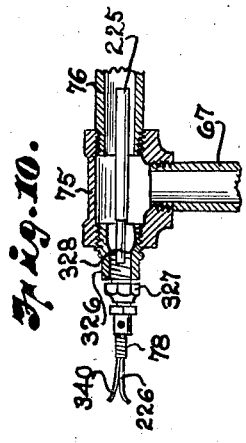

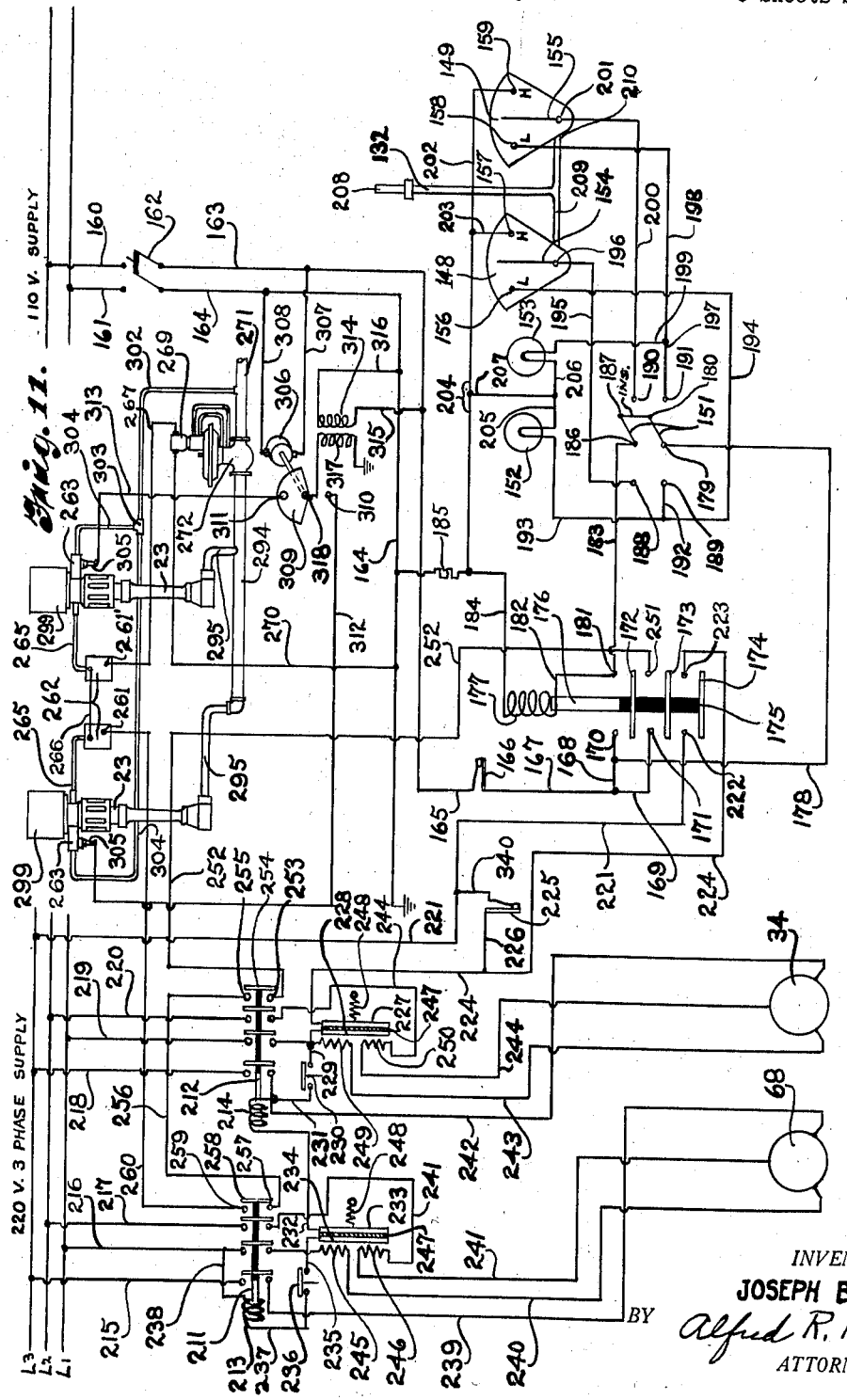

2,340,430

UNITED STATES PATENT OFFICE 2,340,430

CIRCULATING LIQUID HEATER

Joseph B. Sando, Kansas City, Mo., assignor to Western Laundry Machinery Company, a corporation of Missouri Application May 7, 1941, Serial No. 392,295

31 Claims. (Cl. 237—8)

My invention relates to liquid heating devices, and more particularly to a liquid heating device for circulating a fluid between itself and apparatus to be heated thereby, in a manner such that the fluid leaves the heating device under a predetermined pressure and returns to the heating device at atmospheric pressure.

It is a purpose of my invention to provide an apparatus for heating a material that is liquid, within the range of temperatures to which the same is heated for use as a heating medium, and which liquid may be of a character that the same will lose its fluidity, or even solidify, at temperatures of the atmosphere in the room, or other space, in which the heating apparatus and the apparatus to be heated by the liquid is located, said heating apparatus being provided with means for preventing such immobility or solidification of the heat transfer medium.

It is a particular purpose of my invention to provide means for heating a heat transfer medium, which is normally in a liquid form in use, which heating means is provided with means for maintaining the heat transfer medium, in a liquid state, within a predetermined relatively narrow range of maximum and minimum temperatures, considerably above the boiling point of water, and with means for maintaining said medium in a liquid state at a temperature above the temperature at which said heat transfer medium will become substantially immobile, or will solidify, to thus prevent the clogging of the system, comprising conduits extending between the heating means and the apparatus to be heated by the heat transfer medium and any chambers, passages, or other spaces, in which the heat transfer medium may be contained in the apparatus that is to be heated by the heat transfer medium, due to such solidification or increase in viscosity of the heat transfer medium to a point of substantial immobility, said last mentioned means maintaining the heat transfer medium at a temperature much lower than that which might be referred to as the operative temperature thereof when the apparatus is actively in use for heating a piece, or pieces, of apparatus, by means of the heat transfer medium in its liquid state.

The invention further comprises means for selectively controlling the same, so that the heating apparatus will maintain the heat transfer medium at either the higher or the lower range of temperatures above referred to, as may be desired, with means for indicating which of the temperature ranges has been selected by the selective means, and with means independent of said controlling means for halting the operation of the heating means above a predetermined maximum temperature below the boiling point of the liquid heat transfer medium.

It is a further purpose of my invention to provide new and improved means for heating a heat transfer medium in a liquid state, comprising a combustion chamber, fluid fuel burners, such as gas burners, for heating said medium entering said combustion chamber, and means under the selective control of temperature responsive means for controlling the supply of fuel to said burners, for maintaining a draft through the apparatus to obtain the highest efficiency in the transfer of heat from the products of combustion to the heat transfer medium, and for controlling the operation of liquid heat transfer medium circulating means, whereby the same is put under pressure and is brought in heat transfer relation to the products of combustion in a highly efficient manner.

It is a further purpose of my invention to provide in an apparatus of the above mentioned character, means for heating a liquid heat transfer medium comprising a vessel in which said heat transfer medium is caused to circulate, which contains flues, or passages, for the products of combustion above referred to, and which is in communication with conduits mounted within the tubular or flue-like members, that are connected in series so as to provide a circuitous path for the heat transfer medium, said circuitous path leading from the interior of said vessel through the multiplicity of passages for the products of combustion to a discharge conduit leading to the apparatus that is to be heated by the heat transfer medium, whereby the heat transfer medium is preheated in the vessel by the products of combustion from the combustion chamber, and is introduced into the circuitously arranged conduits, to be further heated and discharged at the temperature desired under the control of the temperature responsive means after such heating to a progressively increasing temperature as the heat transfer medium passes from one end to the other end of this circuitous passage.

It is a further purpose of my invention to provide a fluid heating means of the above mentioned character, comprising a collecting chamber, or sump, receiving the heat transfer medium returned from the apparatus heated thereby, which is vented so as to maintain the contents thereof at atmospheric pressure and to provide means comprising a pump withdrawing liquid from the sump or liquid receiving means, and introducing the same under a predetermined pressure into the heating apparatus, said introduction being, preferably, into the lower portion of said vessel, and the circuitous conduit means for heating the heat transfer medium being connected with the upper portion of said vessel.

It is still a further purpose of my invention to provide means for maintaining the circulation of the heat transfer medium and the draft in the apparatus after the operation of the burners at the operating temperature for the heat transfer medium has ceased, so as to utilize the heat that is in the combustion chamber walls to heat the entire mass of heat transfer medium to a temperature above that maintained while under the influence of the lower temperature control, to thus economize in the use of fuel in heating the heat transfer medium to the operating temperature and maintaining the heat transfer medium in a liquid condition after shut down of the apparatus heated thereby, said means comprising a controlling element that will maintain the pump and the fan controlling the draft in operation independent of the fuel burners after the fuel burners have been put out of operation by the operating or high temperature control, or by the switching from the high temperature control to the low temperature control.

It is an important object of my invention to provide means for controlling the operation of the fuel burners, which comprise pilot lights, in a manner to prevent any accidental explosion due to combustible gases released by the fuel burners, said means comprising means for creating a spark at frequent intervals, so that if the pilot light should at any time cease to function temporarily because of an interruption in gas pressure or an undue decrease in gas pressure, only a very small amount of gas can escape therefrom before the same is ignited, and said means further comprises thermostatic means under the control of the pilot light flame, or flames, preventing operation of the main thermostatically controlled gas supply valve for the burners to open the same, unless said pilot lights are in operation.

It is another purpose of my invention to provide means for creating a circuitous path for the heat transfer medium in the heating vessel, and a circuitous path for the products of combustion through the flues, or passages, provided for the same in said heating vessel.

It is an important purpose of my invention to provide a device of the above mentioned character, which is a self-contained unit that can be placed in any convenient location adjacent laundry machinery, or other machinery that requires heating by a liquid or similar medium, this being possible due to the provision of the fan for creating a draft sufficient to obtain complete combustion in the combustion chamber and to circulate the products of combustion through the apparatus and to a discharge stack, which is of such a character that it can be placed in any location without the necessity of providing a tall and expensive stack.

Other objects and advantages of my invention will appear as the description of the drawings proceeds. I desire to have it understood, however, that I do not intend to limit myself to the particular details shown or described, except as defined in the claims.

In the drawings:

Fig. 1 is a view in side elevation partly broken away, of my improved heating apparatus.

Fig. 2 is a view partly in top plan and partly in section taken substantially on the line 2—2 of Fig. 1, and showing a fragmentary portion of apparatus heated by the heat transfer medium.

Fig. 3 is a fragmentary vertical sectional view through the heating apparatus adjacent one end of the heating vessel.

Fig. 4 is a similar view to Fig. 3, adjacent the other end of the heating vessel.

Fig. 5 is a vertical longitudinal sectional view through the heating vessel.

Fig. 6 is a section taken on the line 6—6 of Fig. 5.

Fig. 7 is a vertical sectional view through the sump, or receiver, showing certain associated parts in elevation and partly broken away.

Fig. 8 is a front elevational view of the heating apparatus.

Fig. 9 is a detail vertical sectional view through the fuel control valve for the burners, part of the electrical apparatus associated therewith being shown diagrammatically.

Fig. 10 is a fragmentary section, showing one of the thermostatic elements used for controlling the heating apparatus.

Fig. 11 is a diagrammatic view showing the circuit connections used in the control of the operation of the heating apparatus, and Fig. 12 is a fragmentary view partly in section and partly in elevation of one of the burners.

Referring in detail to the drawings, in Fig. 1 is shown a heating apparatus that is provided with a housing 20, within which is provided a combustion chamber 21 having walls of refractory material 22. Fuel burners 23 extend into the combustion chamber 21 and the products of combustion pass from the combustion chamber 21 into flue-like members 24, which are shown more in detail in Figs. 3, 4, 5 and 6, and into a chamber 26 that provides a passage leading from the flue-like members 24 to the flue-like members 25, the substantially horizontally extending portion 27 of the wall of refractory material providing a partition between the combustion chamber 21 and the stack chamber 28, which is also provided with walls of refractory material 29, the top wall having an opening therein through which the flue pipe 30 extends to the inlet connection 31 of a blower, or fan, 32, the outlet of which is connected with a stack 33, which may be of any convenient height to pass the products of combustion out of the building in which the heating apparatus is located. The blower, or exhaust fan, is operated by means of a motor 34, through any suitable driving means, such as the pulleys 35 and 36, the belt 37 and the drive shaft 38, on which the pulley 36 is mounted.

The flue-like members 24 and 25 extend through a heating vessel that has a cylindrical wall 39 and end walls, or heads, 40 and 41, into which the tubular outer wall portions of the flue-like members 24 and 25 are secured in fluid-tight relation, by welding or in any other suitable manner. The products of combustion will accordingly pass from the combustion chamber 21 into the interior of the vessel made up of the cylindrical wall 39 and the walls, or heads, 40 and 41, within the flue-like members 24, then into the end chamber 26 and through the flue-like members 25 to the flue chamber 28 and then through the outlet pipe, or flue, 30, and the fan, or blower, 32 to the stack 33.

The members 24 and 25 are identical in construction and each comprises an inner tubular member 42 and an outer tubular member 43, between which substantially radially extending members 44 extend to mount the tubular member 42 co-axially with the tubular member 43 in spaced relation thereto, thus providing a multiplicity of similar parallel passages 45 for the products of combustion in an annular series around each inner tubular member 42, and a plurality of heat conducting walls connecting said tubular members 42 and 43, rings 341 being provided for mounting the members 44 in position. The passages within the inner tubular members 42 are shut off from the gases, or products of combustion, passing through the passages 45, as will be obvious as the description proceeds. The chamber 26 is provided with metallic walls 46 and both the cylindrical wall portion 39 of said vessel and the metallic wall portions 46 of the chamber 26 are provided with a heat insulating covering 47, and spaced from the heat insulating covering of the cylindrical wall portion 39 is a sheet metal housing 48, which is a continuation of the housing 20, and extends over the upper portion of the vessel having said tubular wall 39, being mounted in spaced relation thereto by means of the angular brackets 49. The flue connecting chamber 26 has a refractory wall portion 50 lying outside the insulating wall 46 and is provided with a sheet metal outer covering 51, which also extends over the insulating material 47 on the lower portion of the cylindrical wall 39.

Mounted below the above referred to vessel is a liquid container 52, which acts as a receiver for the liquid that is to be heated and which has returned from the apparatus that is heated by means of the liquid, said liquid container being a tank-like member and being mounted on the framework members 53, which, of course, also support the refractory material of the combustion chamber 21 and other parts of the apparatus.

Transverse frame members 54 also are provided, connecting the longitudinal framework members 53, and upstanding frame members 55 are provided, mounted on the frame members 53 for supporting various parts of the heating apparatus and the housing therefor, suitable frame members being mounted on the vertical frame members 55 for supporting the refractory material 22 and for supporting the vessel having the cylindrical wall portion 39, as well as the wall portions of the chambers 26 and 28. The tank-like member 52 is provided with a suitable gauge 56 to indicate the level of the liquid therein in the usual manner, and is of a generally rectangular character, with the flat bottom wall 57 thereof mounted on the transverse frame members 54 and having a flat top wall 58 through which a pair of vent pipes 59 and 60 extend, said vent pipes being secured in liquid-tight relation to the top wall of the tank and communicating with the chamber provided within the tank 52. A tubular container 61 is secured in liquid-tight relation with the vent pipes 59 and 60 above the top of the vessel having the cylindrical wall 39, and a vent pipe 62 terminating in an elbow 63 is connected with the upper side of the tubular member 61, while the vent pipes 59 and 60 are connected with the lower portion thereof.

A return pipe 64 for the liquid that serves as a heat transfer medium leads into the lower portion of the one side wall of said tank member 52 and a suction conduit 65 extends from the return pipe adjacent said tank 52 to the inlet side of the pump 66, which has the discharge pipe 67 extending therefrom, said pump being operated by means of a motor 68 through a suitable driving means comprising the pulleys 69 and 70 rotating with the motor and pump shafts, respectively, the driving belts 71 operating over said pulleys. Said motor and pump are suitably mounted on transverse frame members 72 and 73, respectively, which are connected with the vertical frame members 55 by means of longitudinal frame members 74.

The pump discharge pipe 67 is provided with a T 75 connecting the same with a pipe 76, which leads through suitable pipe connections to a filter 77. Mounted within the T 75 is a thermostatic element from which suitable conductors in a conduit 78 extend, said thermostatic element and its function being described in more detail below. From the filter 77 a liquid conduit 79, which is made up of pipe and pipe fittings of suitable character, leads into the bottom of the vessel having the cylindrical wall 39 through an inlet connection 80 that leads into the chamber provided between the heads 40 and 41 and said tubular wall. Secured in fixed position within the chamber provided within said vessel are the baffle members 81 and 82, said baffle members 81 being secured to the cylindrical wall 39 from the bottom portion thereof to within a desired spacing from the top portion thereof to leave passages between the top edges of the baffles 81 and said cylindrical wall, while the baffle members 82 are secured to said cylindrical wall and extend from the top portion thereof down to near the bottom part of said container, the bottom edges thereof being spaced from the cylindrical wall so as to provide passages between the same and said cylindrical wall at the bottom of said container. Thus a circuitous passage is provided within the container, or vessel, for the liquid heat transfer medium extending from the inlet connection 80 to the discharge or outlet connection 83.

A pipe 84 is connected with said outlet connection and with a T 85, a valve 86 being connected with the top opening of the T 85 and being interposed between said T and a pressure gauge 87, while a liquid conduit 88 extends from the side opening of the T 85, being made up of a plurality of fittings and pipes and leading through a suitable connection, such as a union 89, into one of the tubular members 42, of the upper flue members 25. In order that the path of the liquid through the various pipes 42 can be more readily followed, each of the passages within said pipes is designated by a different reference numeral, the passage into which the pipe 88 leads being designated by the numeral 91. Said pipe 42 is connected with the next adjacent pipe 42 having the passage 92 therein, by means of a U-shaped pipe connection or return bend 93, which is secured to said pipes 42 by means of suitable unions 89, said connection being made within the flue chamber, or flue box, 28.

It will be noted that the conduit 88 passes through the walls of the chamber 26 and that the connection with the tubular member 42 having the passage 91 is made within the chamber 26. The passage 92 is thus connected in series with the passage 91. The passage 94 is similarly connected in series with the passage 92 through a U-shaped tubular member, or return bend, 95. However, the return bends at this end of the apparatus are not connected with the tubular members by means of unions, but are permanently secured thereto, as by welding, or the adjacent tubular members are connected by an integral U-shaped portion, as may be preferred. The passage 96 in the next lower tier of tubular members 42 is connected with the passage 94 by means of a U-shaped connecting member, or return bend, 97, in a similar manner to that already described. The passages 98, 99 and 100 in the upper tier of tubular members are connected in series at the opposite ends thereof by means of the return bends 101, 102 and 103, respectively. It will thus be seen that the tubular members 25 that comprise the upper tier of flue-like members connecting the chamber 26 with the chamber 28, have liquid conduits therein, the passages of which are connected in series so that the liquid will flow back and forth in a circuitous path in the inner pipes, or tubes, 42 of said flue-like members, the passages, or tubes, 42 in the adjacent flue-like members having the liquid therein traveling in opposite directions.

A large U-shaped connecting portion, or return bend, 104 connects the passage 100 in the last of said upper series of tubular liquid conduits with the passage 105 in the tubular member 42 immediately below it within one of the flue-like members 24, and a similar series of tubular passages is provided in the lower portion of said heating apparatus, the passages 105 and 106 being connected by means of the return bend 107, the passages 106 and 108 being connected by means of the return bend 109, the passages 108 and 110 being connected by means of the return bend 111, the passages 112 and 110 being connected by means of the return bend 113, the passages 112 and 114 being connected by means of the return bend 115, and the passages 114 and 116 being connected by means of the return bend 117. The various tubular members 42 in the flues 24 are thus connected in series in a similar manner to those within the flues, or heating elements, 25, and an outlet or discharge pipe 118 is connected by means of a union 89 and other suitable pipe fittings, with the passage 116 in the last tubular member 42.

It will thus be seen that the fluid heater is provided with a plurality of passages for the products of combustion, or other hot gases, passing from the combustion chamber 21 to the flue 33, and that said hot gases, or products of combustion, pass into heat transfer relation with the liquid in the chamber within the tubular walled vessel for the heat transfer medium a plurality of times and that the heat transfer medium is first heated within the said chamber within said vessel, or container, and is circulated through the same by the pump from the inlet connection 80 to the outlet connection 83 in a circuitous passage, and then passes through the pipe 84 and conduit 88 into the series of tubes 42 connected together in a manner such that the liquid passes first through the passage 91 in one direction, through the passage 92 in the opposite direction, and thus back and forth in succession through the passages 94, 96, 98, 99, 100, 105, 106, 108, 110, 112, 114 and 116 to the discharge pipe 118. This provides a very thorough, complete and efficient, as well as rapid transfer of the heat from the gases passing through the flues to the heat transfer medium, inasmuch as the pump and the fan, or blower, are operated simultaneously to cause rapid circulation of the gases, or products of combustion, and the liquid on opposite sides of walls that are heat conducting, and due to the fact that a preliminary heating of the liquid heat transfer medium takes place in the main body thereof in the heating vessel before passing through the series of tubes that are connected together end to end in the alternate fashion above described.

The pipe or conduit 118 leads to a T 120, which has a thermostatic element mounted therein, from which a cable 121 extends, having conductors therein, which are part of a controlling circuit to be explained below. The pipe 122 leads from the T 120 to a T 123, and a branch pipe 124 extends from the T 123 to a valve 125, which is manually operated, which is connected with the T 126 in the return pipe 64 through suitable conduit means 127 made up of pipe and fittings as shown. The return conduit 64 also has a T 128 provided therein, from which the suction connection 65 extends, a valve 129 controlling flow of liquid through the suction connection 65. With the valves 125 and 129 open it will be obvious that the liquid that is being heated will be short-circuited so as to be re-circulated by means of the pump through the heating apparatus to more rapidly increase the temperature thereof when this is desired. Normally the valve 129 would be open and the valve 125 would be closed.

A pipe 130 leads to a T 131, which has thermostatic means mounted therein, from which a conduit 132 containing a liquid extends to suitable temperature responsive controlling means, which will be described more in detail below, and from said T the pipe 133 leads through a pressure actuated valve 134 to a T 135, which is provided with a drain connection 136 having the drain valve 137 controlling the same, and conduit means 138 made up of suitable pipes and fittings extends to an apparatus 139 that is heated by the liquid heat transfer medium, a return conduit 140 extending therefrom and communication between said return conduit 140 and the return pipe 64 being controlled by manually operated valve 141. The heated liquid heat transfer medium passes through the conduit 138 to the apparatus 139 at a predetermined pressure and returns at atmospheric pressure due to the provision of the vent 142 in the return pipe connection to the apparatus.

The filter 77 is provided with means within the same for periodically cleaning the same, which is operated by means of the handle 143, the particular cleaning means not being a part of this invention and not being shown. The filter is also provided with a suitable drain opening from which the drain pipe 144 leads. A drain pipe 145 is also provided extending from a T 146 interposed in the inlet conduit 65 to the pump, discharge therefrom being controlled by means of the valve 147.

Means is provided for controlling the operation of the heating apparatus, comprising the burners, the draft creating means and the liquid circulating means, said controlling means comprising a pair of similar temperature responsive indicating and controlling instruments 148 and 149, which are mounted on the front wall 150 of the housing 20, a switch 151 being also provided controlling the operation of said controlling devices 148 and 149, and the signal lights 152 and 153 being also provided for the purpose of indicating which of the two controlling and indicating devices 148 and 149 are in operation due to the setting of the switch 151. The combined indicating and controlling instruments 148 and 149 are provided, respectively, with combined indicating and movable contact elements 154 and 155 that cooperate with adjustable contacts 156 and 157, and 158 and 159, respectively, the contacts 156, 157, 158 and 159 being adjusted so that the controlling device 148 will control the temperature to which the heat transfer medium is heated between a relatively low minimum and maximum above the temperature at which the same would become too immobile to be circulated by the pumping means provided, and so that the controlling device 149 will control the temperature to which the said medium is heated between a relatively high minimum and maximum, which is a suitable temperature range for heating the apparatus 139 that is to be heated by said heat transfer medium.

Referring to Fig. 11 it will be noted that the controling devices 148 and 149, the switch 151, signal lights 152 and 153, which constitute pilot lights, the contacts 156, 157, 158 and 159, and the movable contact members 154 and 155 are provided in a controlling circuit for various apparatus including the motors 68 and 34, and the burners 23. In said diagram the conductors 160 and 161 are shown as extending from a 110 volt supply line, which would ordinarily be an alternating current supply line, a switch 162 controlling the connection between the conductor 160 and a conductor 163, and the conductor 161 and a conductor 164. The conductor 163 has a branch 165 extending therefrom, which leads to a thermostatic switching element 166, which is the element mounted in the T 120, the conductor 165 and the conductor 167 leading from said thermostatic element 166, being mounted in the conduit 121. The conductor 167 is connected with conductors 168 and 169, which lead, respectively, to stationary contacts 170 and 171 of a switching device which has movable contact elements 172, 173 and 174 mounted on a suitable insulating element 175, so as to be insulated from each other, which is mounted to move with a plunger 176 of iron, serving as the armature of an electro-magnet of the solenoid type having a winding 177.

From the conductor 168 a branch 178 extends to a terminal 179 on the switch 151, which is electrically connected with the movable contact member 180 of said switch. The movable contact member 172 is adapted to bridge the stationary contacts 170 and 181 to connect the conductors 182 and 183 with the conductor 168.

The conductor 182 leads to one end of the winding 177 and a conductor 184 leads from the other end of said winding through a resistance 185 to the conductor 164. The conductor 183 leads to a terminal 186 on the switching device 151, which is electrically connected with the movable contact member 187 of said switching device. Said movable contact element 187 is, of course, insulated from the movable contact element 180. The contact elements 187 and 180 are adapted to be selectively engaged with stationary contacts 188 and 189, or stationary contacts 190 and 191, dependent upon the position to which the switch 151 is adjusted. The stationary contact 189 has a conductor 192 connected therewith, from which the conductors 193 and 194 extend, the conductor 193 leading to the pilot light, or signal lamp, 152, and the conductor 194 leading to the contact 156. A conductor 195 extends from the stationary contact 188 to a terminal 196, with which the movable contact element 154 is electrically connected. A conductor 197 extends from the stationary contact 191 and connects this with the conductors 198 and 199, the conductor 199 leading to the pilot light, or signal lamp, 153, while the conductor 198 leads to the contact 158. The contact 190 is connected by means of the conductor 200 with the movable contact element 155 leading to a terminal 201, with which said movable contact element 155 is connected. The contacts 157 and 159 are connected by means of the conductors 202 and 203 with the conductor 204 connected with the conductor 184 and through the resistance 185 leading to the conductor 164. Conductors 205 and 206 extend from the signal lamps 152 and 153 to a conductor 207, which is connected with the conductor 204 to thus connect the signal lamp 152 or the signal lamp 153 in the circuit, dependent upon the position of the switching device 151.

The temperature responsive element 208, which is located in the T 131, has the liquid conduit 132 having branches 209 and 210 leading therefrom to the indicating and controlling instruments 148 and 149. The internal construction and operation of said temperature responsive means comprising the element 208 and its connections with the devices 148 and 149 is not part of this invention, except to the extent that the position of both of the movable contact elements 154 and 155 is dependent upon the temperature of the liquid engaging the element 208. The controlling device 148 is of such a character, and the contacts 156 and 157 are so set, however, that the element 208 will cause the movable contact element 154 to engage the contact element 156 whenever the minimum of the low temperature range is reached and the contact element 157 whenever the maximum of the low temperature range is reached, while the controlling element 149 is of such a character that the heat responsive means 208 will move the movable contact element 155 so that it will engage the stationary contact 158 when the minimum of the high temperature range is reached, and will engage the contact 159 when the maximum of the high temperature range is reached. The temperature responsive switching element 166 is of such a character and is so adjusted that the same will move to open circuit position when a temperature is reached above the temperature at which the contact 155 engages the contact 159, but below the boiling point of the liquid that is to be heated, preferably, being set at 500° F. for the liquid that is at present preferred for heating the apparatus 139 that it is preferred to heat by said heat transfer medium.

With the switch 162 closed and the switch 151 being thrown to a position that the contacts 187 and 188 engage, and the contacts 180 and 189 engage, when the minimum temperature for the low temperature range, or low temperature control, is reached, the contact element 154 will engage the contact element 156. However, no matter what the position of the contact 154, the signal lamp 152 will be energized as soon as the switch is thrown into position to close the circuit between the contacts 180 and 189 and the contacts 187 and 188. With the contact 154 in engagement with the contact 156 the circuit will be completed from the conductor 163 through the conductor 165, temperature responsive element 166, conductor 167, conductors 168 and 178 to the contact 180, through the switch 151, through the conductors 192 and 194 to the contact 156, then through the movable contact member 154 and conductor 195 to the contact 188, through the switch 151 to the conductor 183, and through the winding 177, conductor 184 and resistance 185 to the conductor 164. The winding 177 being energized, the plunger will be drawn upwardly into the winding until the movable contact element 172 engages the contacts 170 and 181, thus completing the circuit from the conductor 168 to the conductor 182 and thus maintaining the winding 177 energized even though the movable contact 154 should leave the stationary contact 156, as will occur when the heating apparatus is in operation. Thus the switch having the movable contacts 172, 173 and 174 will be held in circuit closing position while the movable contact element 154 is in engagement with the stationary contact 156 and after it leaves the same, until said movable contact 154 engages the stationary contact 157. When this takes place, the circuit will be completed between the conductor 164 and the conductor 163, through the resistance 185, the conductor 204, the conductor 203, contact 157, contact 154, conductor 195 through the switch to the conductor 183 and through the contact 172 to the conductors 168 and 167, and through the closed thermostatically controlled switching element 166 to the conductors 163 and 165, thus shunting, or short-circuiting, the winding 177, whereupon the same will cease to attract the plunger 176 and the plunger will drop by gravity out of the winding 177 into open circuit position, thus disengaging the contact 172 from the contacts 170 and 181. Said switching element also controls other apparatus, which will be described below.

When the switch 151 is thrown to the alternative position with the contacts 187 and 190 in engagement and the contacts 180 and 191 in engagement, the controlling element 149 will control the operation of the various apparatus of the heating means, and the pilot light, or signal lamp, 153 will indicate that the switch has been thrown to this position, as this will provide a connection between the conductor 178 and the conductor 199, as will be obvious, at the same time the connection between the conductor 178 and the conductor 193 will be broken, thus throwing the lamp 152 out of operation. With the contact 155 in engagement with the contact 158 and the switch 151 in said last mentioned position, the winding 177 will be energized due to the fact that the conductor 178 will be connected through the switching means with the conductor 198 leading to said contact 158, and the conductor 200 leading from the movable contact 155 will be connected with the conductor 183 leading to the winding 177, thus energizing the winding in a similar manner to that previously described.

As soon as the winding is energized the switching element having the movable contacts 172, 173 and 174 will be moved to circuit closing position and the winding will continue to be energized in the same manner as previously described, even though the moving contact 155 leaves the stationary contact 158, and this will continue until the contact 159 is engaged by the contact 155. When this takes place, the winding 177 will be shunted or short-circuited in a similar manner to that previously described, due to the fact that the contact 159 is connected with the conductor 204 through the conductor 202 and the contact 155 is connected with the conductor 183 through the switch 151. As soon as the winding is de-energized, the switching means controlled thereby will move to the open circuit position shown in Fig. 11.

The motors 68 and 34 are controlled by a pair of switches having movable switching elements 211 and 212, respectively, which are controlled in their operation by windings 213 and 214, respectively, so that when said windings are energized the switching means will be moved to circuit closing position. Said switching means control the supply of current to the motors 68 and 34 from a 220 volt three-phase supply line. The conductors 215, 216 and 217 lead into the switch having the movable switching element 211 and the conductors 218, 219 and 220 lead into the switch having the movable switching element 212. A conductor 221 leads from one of said supply lines to the stationary contact 222, which is connected with the stationary contact 223 by the movable contact element 174, when the switch controlled by the winding 177 is in circuit closing position. A conductor 224 leads from the stationary contact 223 to one contact 227 of an overload switch, which has a cooperating contact 228. A thermostatically controlled switching device 225 is bridged across the conductors 221 and 224 by means of conductors 240 and 226. The contact 228 is connected by means of the conductor 229, with a normally closed manually operable switching element 230, which controls the connection between the conductor 229 and a conductor 231 leading to the winding 214. From the winding 214 a conductor 232 leads to one contact 233 of an overload switch having a cooperating contact 234 and from said cooperating contact 234 a conductor 235 leads to the manually controlled switching element 236, which is normally closed, and which controls the connection between the conductor 235 and a conductor 237 leading to the winding 213, which is connected with a conductor 216 by a conductor 238.

Thus, if the movable switching element 174 is in circuit closing position, both of the windings 214 and 213 will be energized to move the movable switching elements 211 and 212 to circuit closing position, the movable contacts of which connect the conductors 215, 216 and 217 with the conductors 239, 240 and 241 leading to the motor 68, and the conductors 218, 219 and 220 with the conductors 242, 243 and 244 leading to the motor 34. Heating elements 245 and 246 are interposed in the conductors 240 and 241, respectively, to heat the fusible material 247 to move the contact 233 away from the contact 234 under the influence of the spring 248 when the motor 68 is overloaded. In a similar manner the heating elements 249 and 250 are interposed in the conductors 243 and 244 to separate the contact 227 from the contact 228 under the influence of the spring 248 when the motor 34 is overloaded. It will be noted that if either of the contacts 227 or 233 are moved to open circuit position, or if either of the manually operable switching members 230 or 236 are moved to open circuit position, as well as if thermostatic element 225, moves to open circuit position, both windings 213 and 214 will be de-energized and the switching elements 211 and 212 will move to open circuit position under the influence of a spring, or any other suitable member, thus halting the operation of the motors 34 and 68. The thermostatically controlled switching element 225, for the particular liquid that, preferably, is used as a heat transfer medium, is so adjusted that the same will be closed at a temperature of 350° F. and will remain closed above that temperature, while the same will open below said temperature.

A stationary contact member 251 is provided, with which the contact member 173 engages when the movable switching element controlled by the winding 177 is held in circuit closing position, said contact 173 connecting the stationary contact 171 and the contact 251 when in such circuit closing position. A conductor 252 extends from the contact 251 to a contact 253 provided in the switch controlling the motor 34, a movable contact element 254 of said switch connecting said contact 253 and a contact 255 when said switch is in circuit closing position, the contact 255 having a conductor 256 extending therefrom that leads to the contact 257, which is engaged by the movable contact member 258 provided on the switch controlling the operation of the motor 68 to connect said contact 257 with the stationary contact 259, from which the conductor 260 leads to a contact 261 of a thermostatically controlled switch having a movable contact 262, (see Fig. 9) said switch being part of a thermostatic control under the influence of the pilot light of one of the burners 23, the pilot lights being of any desired character and being indicated generally by the numeral 263 in Figs. 11 and 12, the thermostatic element of the thermostatic switching means within range of the pilot lights being indicated generally by the numeral 264 and having liquid conduits 265 leading therefrom to the respective thermostatic switching elements.

A conductor 266 connects the two thermostatic switching elements 262 in series and the contact 261' of the second of said thermostatic switching elements is connected by means of a conductor 267 with a winding 268 of an electro-magnetically controlled plunger valve 269, a conductor 270 extending from said winding 268 to the conductor 164. Thus when the contacts 171 and 251 are bridged by the movable contact element 173 by a closing of the magnetically operated plunger switch, a circuit is completed from the conductor 163 through the conductor 165, thermostatically controlled switching element 166, conductor 167, conductor 169, conductor 252, switching element 254, conductor 256, switching element 258, conductor 260, thermostatically controlled switching elements 262, conductor 267, and conductor 270, to the conductor 164, and if the switch 162 is closed the 110 volt current supply will operate to energize the winding 268 to open the plunger valve mechanism 269 to supply gas to the burners 23 in a manner to be described below.

However, this circuit will not be completed and the burners will not be supplied with gas if either of the pilot lights is not functioning, as one or both of the thermostatic switching elements 262 will be in open circuit position. Also the burners 23 will not be supplied with gas if the switching elements 211 and 212 are not in circuit closing position, as the circuit will be broken at the movable contact members 258 and 254. The same would be true, if either of these were not in circuit closing position. In addition to this, the thermostatic element 225 has to be in circuit closing position. For the liquid that is utilized as a heat transfer medium for heating the apparatus 139, the contacts 156 and 157 are set so that the controlling device 148 will maintain the liquid at a temperature of between 250° and 300° F. to keep the same in a completely liquid condition. The contacts 158 and 159 are set to maintain the operating temperature of the liquid between 430° and 450° F. this being the preferred temperature at which to operate the apparatus 139. The thermostatic element 225 is set to close at 350° F. and remain closed above that temperature, while the thermostatic element 166 is set to open at 500° F. and remain open above that temperature.

As a result, under normal operating conditions, when the control device 149 is functioning, the switching element controlled by the winding 177 will merely turn the gas to the burners 23 on and off, dependent on whether the contact 155 is in engagement with the contact 158 or with the contact 159, this being due to the fact that the thermostatic element 225 is set at such a temperature that the circuit controlling the supply of current to the windings 213 and 214 will keep the switching elements 211 and 212 in circuit closing position, keeping the motors 68 and 34 in operation, but the connection between the contacts 171 and 251 will be broken to cause the valve 269 to be closed, thus closing off the supply of gas to the burners 23 in a manner to be described below.

However, when the low temperature control 148 is in operation it will control the operation of the motors 68 and 34 and the burners 23, so that the burners cannot operate until the motors 34 and 68 have had their operating circuits closed due to the operation of the switching elements 211 and 212, but said switching elements 211 and 212 will move between open and closing positions along with the switching element controlled by the winding 177 whenever the contact 154 engages the contact 157 and whenever the contact 154 engages the contact 156. Of course, it is to be understood that in the case of the controlling device 148, the motors and the burners will continue to operate, as the moving contact 154 moves to the right due to the fact that the liquid is being heated by the heating apparatus, and will continue until the contact 154 engages the contact 157, while in the case of the controlling device 149 the burners will continue to operate after the contact 155 leaves the contact 158, until it engages the contact 159 due to the liquid having been heated by the heating apparatus, but that the motors will continue to function to draw heat out of the combustion chamber until the burners again go on. Should the switching means comprising the movable contact element 155 fail to function to shut off the burners when the same engages the contact 159, the thermostatic element 166 will break the controlling circuit for the burners when the temperature reaches 500° F.

The gas supply pipe, or main gas line, is indicated by the numeral 271. Said gas line leads to the diaphragm valve 272 shown more in detail in Fig. 9. Said valve has a valve member 273, which is seated by means of a spring 274 against a valve seat 275, the position of said valve member being determined by means of a diaphragm 276 mounted in a chamber having a wall 277 extending from the upper portion of the upper valve body 278, and a cover member 279 completing the diaphragm chamber, the diaphragm being clamped between flanges on the members 277 and 279 in a well known manner, and a guide 280 being provided for the valve stem 281 in the cover member 279. A chamber 282 in the valve member 272 is connected with the gas supply pipe 271 and a by-pass 283 leads from said chamber 282 to the pipe 284, said pipe leading into a chamber 285, which leads to the valve seat 286, which is engaged by the plunger valve 287 when the same is in closing position, said valve being held in closing position by the weight of the plunger 288, which constitutes a movable core or armature for the solenoid or winding 268, and is drawn upwardly when the winding 268 is energized to open the passage between the chamber 285 and a chamber 289, from which the pipe 290 leads to a passage 291 in the valve body 278, said passage leading into the chamber 292 under the diaphragm 276, said passage being of an annular character, as will be obvious from Fig. 9.

The gas entering the chamber 292 will gradually cause the diaphragm 276 to be raised, thus graduallly lifting the valve 273 from its seat to gradually open the passage between the chamber 282 and the chamber 293 in the valve 272. The chamber 293 is connected with the burner supply pipe 294, which supplies gas to the burners 23 through the branches 295, which may be provided with manually operated valves 296 for shutting off either or both said burners manually, should this be desired. Primary air mixers 297 and secondary air mixers 298 are provided for said burners, and as will be evident from Fig. 12. Said burners have a box-like refractory portion 299 mounted on the forward ends thereof within the refractory wall of the combustion chamber 21, said refractory box-like members being mounted in suitable metallic frames 300 forming a part of said burners, a flaring passage 301 being provided in each burner leading into the combustion chamber 21.

A branch pipe 302 extends from the main gas supply pipe 271 to a T 303, from which the branch pipes 304 extend to pilot lights 263. Thus gas is supplied to the pilot lights as long as the main supply pipe 271 is being supplied with gas, and said pilot lights are being kept constantly in operation. To assure such constant operation of said pilot lights and to re-ignite the same in case the gas supply should get too low to properly operate the pilot lights, or be interrupted, spark plugs 305 are provided located in such position relative to the pilot lights that the gas passing therefrom would be ignited promptly by said spark plugs. The spark plugs are operated by a timer mechanism 306, which is connected with the conductors 163 and 164 by means of the conductors 307 and 308, said timer having a movable contact element 309, which alternately engages the stationary contacts 310 and 311, from which the conductors 312 and 313 lead to the spark plugs so that a high tension current is supplied to each spark plug alternately, the high tension current being supplied by an induction coil having the primary winding 314 connected with the conductors 163 and 164 by the conductors 315 and 316, and having a secondary winding 317 that is grounded at one end thereof in the usual manner and connects with the moving contact 309 through the conductor 318 at the other end thereof.

The diaphragm valve 272 is provided with means for venting or discharging the gas from the chamber 292 under the diaphragm when the winding 268 is de-energized and the plunger 288 drops into the position shown in Fig. 9. When this position of the valve is reached, the beveled face 319 of the valve member disengages the seat 320 controlling communication between the chamber 289 and a chamber 321, which has a passage 322 extending therefrom connected with the vent pipe 323, which leads into the combustion chamber, so that any gas that is vented from under the diaphragm will escape into the combustion chamber and not into the room. It will be obvious that with the valve in the position shown in Fig. 9, the conduit 290 leading from the chamber 292 will be connected with the vent pipe 323 and the pressure under the diaphragm will be relieved, causing the spring 274 to seat the valve 273 and shut off the main gas supply. In order to control the rate of opening of the valve 273 an adjustable pin-like member 324 is provided, which is adapted to be moved toward and away from the orifice in the union 325 connecting the pipe 284 with the body portion of the member having the chamber 285 therein. Thus the rate of discharge of gas into the chamber 285 will be controlled by the position of the member 324, which will determine the rate at which the chamber 292 is filled thereby sufficiently to raise the valve 273 to wide open position.

The mounting of one of the thermostatic elements in the system is illustrated in Fig. 10, the thermostatic element shown being that provided in the T 75, which connects the pipes 67 and 76. A special plug-like member 326 is mounted in the T 75 and a bushing 327 is provided for connecting the conduit 78 liquid-tight with said plug 326. The conductors 324 and 226 are mounted in the conduit 78 and extend in a tubular member 328 to the thermostatic switching device 225, which is provided with a suitable heat responsive element within the same, the particular construction of which is not a part of this invention. The thermostatic means, it will be noted, is in this manner mounted directly within the stream of liquid passing from the pipe 67 through the T into the pipe 76 and will be affected directly by the temperature of said liquid. The other thermostatic element 166 is similarly mounted, and a similar mounting is provided for the heat responsive means 208 in the T 131.

A valve 329 is provided in the pipe 122 to control flow of liquid therethrough, so that if it is desired to dismantle any of the piping and maintain the liquid within the heating device, this can be done by moving the valve 329 to closing position. A T 330 in the conduit 79 may be provided with a drain pipe connection 331 controlled by a drain valve 332, so that liquid can be drained from this conduit 79 if desired. The drain pipe 144 on the filter is also provided with a valve 333, as will be obvious. The pilot lights may be provided with valves 334 for shutting these off when the apparatus is not in use at all. However, ordinarily, the pilot lights are kept constantly in operation.

The pump and the motor therefor are, preferably mounted on a suitable platform 335 on the housing portion 48, a suitable mounting 336 being provided for the bearings for the shaft 38. The electrical supply lines, preferably, enter through a conduit 337, which runs to a panel board 338, upon which the various switches are mounted in suitable housings as shown, the particular location of the switches on the panel board being immaterial to the invention. In addition to the pressure gauge 87, a pressure gauge 339 is, preferably, provided on the front wall 150, so that the pressure and temperature are readily readable from the front of the device.

A liquid heat transfer medium suitable for use in my circulating liquid heater is a special petroleum distillate that has a a flash point of 550° F. and a fire point of 620° F.

In operation, the controlling device 149 will be adjusted permanently for the minimum and maximum operating temperatures of the liquid heat transfer medium that it is desired to heat with the apparatus, and the pilot lights being once put in operation, the valves leading to the same will be left constantly open and the switch 162 will be kept constantly closed. With this condition existing, engagement of the movable contact member 155 with the contact member 158 when the liquid is at or below the minimum operating temperature will close the magnetically controlled switch having the winding 177, which will close the switching elements 211 and 212 to set the motor 68 and 34 in operation, and will also set the burners 23 in operation, provided the pilot lights are in operation. This operation of the burners and the motors 68 and 34 operating the pump 66 and the fan 32, respectively, will continue until the maximum operating temperature of the liquid is reached, whereupon the movable contact member 155 will engage the contact member 159, causing the plunger 176 of the magnetically controlled switch to drop to open circuit position, whereupon the burners 23 will be thrown out of operation through the release of the plunger 288 by the solenoid, or winding, 268. However, the motors 34 and 68 will continue to operate the fan, or blower, and the pump, because the thermostatically controlled switching means 225 will remain closed between the minimum and maximum operating temperatures, and even above the minimum and maximum operating temperatures. Thus the draft will continue to be created and the liquid will continue to be circulated through the heater, causing all of the heat that is in the combustion chamber and refractory walls to be transferred to the liquid heat transfer medium. This will continue as long as the heat transfer medium at operating temperatures is to be supplied to the apparatus 139, the burners 23 being switched on and off, dependent upon whether the contact member 155 engages the contact member 158 or the contact member 159, but the fan and pump continuing to operate whether the burners are on or off.

When it becomes time to shut off the apparatus 139, the switch 151 is thrown from the position, with the contacts 187 and 188 in engagement with the contacts 190 and 191, to the alternative position, with the contacts 187 and 188 and the contacts 180 and 189 in engagement, the switch being of such a character that it can only assume either a position in engagement with the contacts 190 and 191, or in engagement with the contacts 188 and 189. The controlling element 148 is then thrown into operation by this movement of the switch 151, and this controlling element continues in operation until the switch is thrown into the alternative position again. While the controlling element 148 is controlling the operation of the device, the temperature will at first be dropping from the higher operating temperature to the low temperature maintained by this controlling element 148, and the fan and pump will be kept in operation due to the fact that the motors 34 and 68 will not be thrown out of operation when the shift is made to the low temperature control 148, inasmuch as the thermostatic element 225 will remain closed until a temperature of 350° F. has been reached in the downward drop of the temperature from operating temperatures. At this time the contact 154 will be in engagement with the contact 157. However, by operating the fan and pump during this time, the heat will be extracted from the combustion chamber and the walls of refractory material to utilize the heat stored in these walls to maintain the heat transfer medium in a liquid, mobile condition, saving gas or other fuel and preventing the operation of the low temperature control unnecessarily. After the temperature drops below 350° F. the motors 34 and 68 will be shut off due to the action of the switching elements 211 and 212 responding to the break in the circuit by the thermostatic element 225, and will not again be started until the contact 154 engages the contact 156, whereupon said motors will again be started and the burners thrown into operation in the manner previously described and will continue in operation until the liquid has been heated to such a temperature that the contact 154 will engage the contact 157. When the contact 154 engages the contact 157 the burners, as well as both motors, will be discontinued in operation due to movement of the switch contacts 172, 173 and 174 to open circuit position, the thermostatic element 225 no longer keeping the circuit controlling the windings 213 and 214 closed, irrespective of the position of the switching element 174.

While the tank 52 is vented in the manner already described, and the apparatus 139 is vented at 142, there is a possibility that the rapid cooling of the heat transfer liquid in the apparatus 139 when the pump ceases operation, may cause a partial vacuum to be developed in the heat transfer liquid supply pipe 138, which could withdraw liquid from the heating device due to the creation of this vacuum, if it were not for the check valve 134, which is a spring loaded valve that responds to a pressure of five pounds to the square inch or more, so that the same will open when the pump is in operation, but will remain closed to prevent such action when the pump is not in operation. As heretofore explained, the burners 23 will not go into operation if the pilot lights are out, and will be thrown out of operation by the thermostatic means 166, if the temperature exceeds the maximum operating temperature to an undesirable extent. Also, if a decrease in pressure takes place, or an interruption in pressure takes place in the gas, and then the pressure again increases and the pilot lights should have gone out because of this variation in pressure of the gas, the spark plugs provided will immediately re-kindle the pilot lights. The apparatus is accordingly substantially automatic in operation and safe, and is also substantially self-contained, being so mounted that the same can be transported as a unit and installed in a laundry, or other similar place, and connected with the apparatus that is to be heated by the heat transfer medium in a simple manner without requiring any particular knowledge as to the details of construction of the apparatus.

What I claim is:

1. A heater of the character described, comprising a fluid-tight vessel, means for supplying fluid to be heated thereto, a plurality of conduits for the products of combustion extending through said vessel, fluid conduits connected with said vessel to receive fluid therefrom, said fluid conduits extending within said conduits for the products of combustion, and means for mounting said fluid conduits in spaced relation to said conduits for the products of combustion, comprising a plurality of radial fins constituting heat conducting walls connecting said conduits for the products of combustion and said fluid conduits, said fins extending continuously longitudinally between said conduits.

2. A heater of the character described, comprising a fluid-tight vessel, a combustion chamber at one end thereof, a stack, flues mounted lengthwise in said vessel in fluidtight relation therewith and communicating with said combustion chamber and stack, means connecting said flues to lead the products of combustion through said vessel a plurality of times from said combustion chamber to said stack, inlet means for supplying fluid to be heated to said vessel near one end and near the bottom thereof, fluid conduits mounted in said flues and connected with said vessel near the top and near the other end thereof, means directing flow of said fluid to engage said fluid a plurality of times with said flues in passing from said inlet to the connection with said fluid conduits, a discharge conduit connected with said fluid conduits, means connecting said fluid conduits to lead the fluid therein through said flues a plurality of times from said vessel to said discharge conduit, and means for circulating said fluid to flow through said inlet and said fluid conduits at a rapid rate.

3. A heater of the character described, comprising a fluidtight vessel, a combustion chamber at one end thereof, a stack, flues mounted lengthwise in said vessel in fluidtight relation therewith, said flues comprising a lower set communicating with said combustion chamber and an upper set communicating with said stack, means connecting said flues of one set with those of the other set to lead the products of combustion through said vessel a plurality of times from said combustion chamber to said stack, inlet means for supplying fluid to be heated to said vessel near one end and near the bottom thereof, fluid conduits mounted in said flues, said fluid conduits being all connected in a single series, the first of said series being connected with said vessel near the top and near the other end thereof, means in said vessel providing a circuitous path for said fluid between said inlet means and the connection for said fluid conduits therewith, a discharge conduit connected with the last fluid conduits of said series, and means connecting each of said fluid conduits with the next conduit of said series to lead the fluid therein successively first through the flues of said upper set and then through the flues of said lower set and to said discharge conduit.

4. A heater of the character described comprising a vessel, means for passing liquid to be heated through said vessel in a circuitous path, a combustion chamber, means for passing products of combustion from said chamber into heat transfer relation to the contents of said vessel a plurality of times, and means for receiving the liquid from said vessel and conducting the same back and forth in a circuitous path a multiplicity of times into heat transfer relation with the products of combustion in the means for passing said products of combustion into heat transfer relation to the contents of said vessel.

5. A heater of the character described comprising a vessel, means for passing liquid to be heated through said vessel in a circuitous path, comprising liquid circulating means, temperature responsive means controlling the operation of said liquid circulating means, a combustion chamber, means for passing products of combustion from said chamber into heat transfer relation to the contents of said vessel a plurality of times, and means for receiving the liquid from said vessel and conducting the same in a circuitous path a multiplicity of times into heat transfer relation with the products of combustion in the means for passing said products of combustion into heat transfer relation to the contents of said vessel.

6. A heater of the character described comprising a vessel, means for passing liquid to be heated through said vessel in a circuitous path, a combustion chamber, means for passing products of combustion from said chamber into heat transfer relation to the contents of said vessel a plurality of times, comprising draft creating means, temperature responsive means controlling the operation of said draft creating means, and means for receiving the liquid from said vessel and conducting the same in a circuitous path into heat transfer relation with the products of combustion in the means for passing said products of combustion into heat transfer relation to the contents of said vessel.

7. A heater of the character described comprising a vessel, means for passing liquid to be heated through said vessel in a circuitous path, comprising liquid circulating means, a combustion chamber, means for passing products of combustion from said chamber into heat transfer relation to the contents of said vessel a plurality of times, comprising draft creating means, temperature responsive means simultaneously controlling the operation of said draft creating means and said liquid circulating means to circulate said liquid only while said draft is being created, and means for receiving the liquid from said vessel and conducting the same in a circuitous path into heat transfer relation with the products of combustion in the means for passing said products of combustion into heat transfer relation to the contents of said vessel.

8. A heater of the character described comprising a vessel, means for passing liquid to be heated through said vessel in a circuitous path, comprising liquid circulating means, a combustion chamber, means for passing products of combustion from said chamber into heat transfer relation to the contents of said vessel a plurality of times, comprising draft creating means, a plurality of temperature responsive means operating over different temperature ranges simultaneously controlling the operation of said draft creating means and said liquid circulating means to circulate said liquid only while said draft is being created, means for selecting one of said temperature responsive controlling means and means for receiving the liquid from said vessel and conducting the same in a circuitous path into heat transfer relation with the products of combustion in the means for passing said products of combustion into heat transfer relation to the contents of said vessel.

9. A heater of the character described comprising a vessel, means for passing liquid to be heated through said vessel in a circuitous path, comprising liquid circulating means, a combustion chamber, fuel burners in said combustion chamber, means for passing products of combustion from said chamber into heat transfer relation to the contents of said vessel a plurality of times, comprising draft creating means, means for receiving the liquid from said vessel and conducting the same in a circuitous path into heat transfer relation with the gases in the means for passing said products of combustion into heat transfer relation to the contents of said vessel, and temperature responsive means controlling the operation of said burners, said draft creating means and said liquid circulating means comprising means for operating said burners, draft creating means and fluid circulating means in unison to maintain the temperature of the liquid between predetermined minimum and maximum temperatures, means for throwing said operating means into and out of operation, and means for operating said draft creating means and said liquid circulating means independently of said burners to transfer heat from said combustion chamber to said liquid after throwing said first operating means out of operation.

10. A heater of the character described comprising a vessel, means for passing liquid to be heated through said vessel in a circuitous path, comprising liquid circulating means, a combustion chamber, fuel burners in said combustion chamber, means for passing products of combustion from said chamber into heat transfer relation to the contents of said vessel a plurality of times, comprising draft creating means, means for receiving the liquid from said vessel and conducting the same in a circuitous path into heat transfer relation with the gases in the means for passing said products of combustion into heat transfer relation to the contents of said vessel, and temperature responsive means controlling the operation of said burners, said draft creating means and said liquid circulating means comprising means for operating said burners, draft creating means and fluid circulating means in unison to maintain the temperature of the liquid between predetermined minimum and maximum temperatures much higher than the boiling point of water, means for operating said burners, draft creating means and fluid circulating means in unison to maintain the temperature of the liquid between predetermined minimum and maximum temperatures much lower than said first mentioned temperatures, temperature controlled means for throwing each of said operating means into and out of operation, and means for selecting either of said temperature controlled means for controlling said operating means.

11. A heater of the character described comprising a vessel, means for passing liquid to be heated through said vessel in a circuitous path, comprising liquid circulating means, a combustion chamber, fuel burners in said combustion chamber, means for passing products of combustion from said chamber into heat transfer relation to the contents of said vessel a plurality of times, comprising draft creating means, means for receiving the liquid from said vessel and conducting the same in a circuitous path into heat transfer relation with the gases in the means for passing said products of combustion into heat transfer relation to the contents of said vessel, and temperature responsive means controlling the operation of said burners, said draft creating means and said liquid circulating means comprising means for operating said burners, draft creating means and fluid circulating means in unison to maintain the temperature of the liquid between predetermined minimum and maximum temperatures much higher than the boiling point of water, means for operating said burners, draft creating means and fluid circulating means in unison to maintain the temperature of the liquid between predetermined minimum and maximum temperatures much lower than said first mentioned temperatures, temperature controlled means for throwing each of said operating means into and out of operation, means for selecting either of said temperature controlled means for controlling said operating means, and means for operating said draft creating means and said liquid circulating means independently of said burners to transfer heat from said combustion chamber to said liquid after throwing said first operating means out of operation.

12. In a device of the character described, means for heating a liquid, apparatus heated by said liquid, and means for circulating said liquid between said heating means and said apparatus, said liquid having a much higher boiling point than water and being of insufficient mobility to be circulated at atmospheric temperatures, said heating means comprising controlling means for maintaining said liquid at a temperature between a minimum and a maximum required to heat said apparatus to an operating temperature, controlling means for maintaining said liquid at a temperature sufficient to maintain the mobility of said liquid to permit circulation thereof, but lower than said minimum, and means for selecting either of said controlling means.

13. In a device of the character described, means for heating a liquid, apparatus heated by said liquid, and means for circulating said liquid between said heating means and said apparatus, said liquid having a much higher boiling point than water and being of insufficient mobility to be circulated at atmospheric temperatures, said heating means comprising controlling means for maintaining said liquid at a temperature between a minimum and maximum required to heat said apparatus to an operating temperature, controlling means for maintaining said liquid at a temperature sufficient to maintain the mobility of said liquid to permit circulation thereof, but lower than said minimum and means for selecting either of said controlling means, said heating means comprising means for passing hot gases into heat transfer relation to said liquid, and said controlling means comprising temperature responsive means for simultaneously throwing the means for passing said gases and the circulating means into and out of operation.

14. In a device of the character described, means for heating a liquid, apparatus heated by said liquid, means for circulating said liquid between said heating means and said apparatus so that said liquid passes from said heating means to said apparatus under a pressure higher than atmospheric and returns from said apparatus at atmospheric pressure comprising a vented receiver, a pump between said receiver and said heating means, a feed line extending from said heating means into said apparatus, and a vented return line extending from said apparatus to said receiver.

15. A heater of the character described comprising a vessel, means for passing liquid to be heated through said vessel in a circuitous path, comprising liquid circulating means, a combustion chamber, fuel burners in said combustion chamber, means for passing products of combustion from said chamber into heat transfer relation to the contents of said vessel a plurality of times, comprising draft creating means, means for receiving the liquid from said vessel and conducting the same in a circuitous path into heat transfer relation with the gases in the means for passing said products of combustion into heat transfer relation to the contents of said vessel, and temperature responsive means controlling the operation of said burners, said draft creating means and said liquid circulating means comprising means for operating said burners, draft creating means and fluid circulating means in unison to maintain the temperature of the liquid between predetermined minimum and maximum temperatures, said means for operating said burners comprising pilot lights, a valve controlling the supply of fuel to said burners, means for opening said valve, and means preventing said operating means from opening said valve except when said pilot lights are burning.

16. A heater of the character described comprising a vessel, means for passing liquid to be heated through said vessel in a circuitous path, comprising liquid circulating means, a combustion chamber, fuel burners in said combustion chamber, means for passing products of combustion from said chamber into heat transfer relation to the contents of said vessel a plurality of times, comprising draft creating means, means for receiving the liquid from said vessel and conducting the same in a circuitous path into heat transfer relation with the gases in the means for passing said products of combustion into heat transfer relation to the contents of said vessel, and temperature responsive means controlling the operation of said burners, said draft creating means and said liquid circulating means comprising means for operating said burners, draft creating means and fluid circulating means in unison to maintain the temperature of the liquid between predetermined minimum and maximum temperatures, said means for operating said burners comprising pilot lights, a valve controlling the supply of fuel to said burners, igniting means for said pilot lights operating at closely spaced intervals independently of said operating means, means for opening said valve, and means preventing said operating means from opening said valve except when said pilot lights are burning.

17. A heater of the character described comprising a vessel, means for passing liquid to be heated through said vessel in a circuitous path, comprising liquid circulating means, a combustion chamber, fuel burners in said combustion chamber, means for passing products of combustion from said chamber into heat transfer relation to the contents of said vessel a plurality of times, comprising draft creating means, means for receiving the liquid from said vessel and conducting the same in a circuitous path into heat transfer relation with the gases in the means for passing said products of combustion into heat transfer relation to the contents of said vessel, and temperature responsive means controlling the operation of said burners, said draft creating means and said liquid circulating means comprising means for operating said burners, draft creating means and fluid circulating means in unison to maintain the temperature of the liquid between predetermined minimum and maximum temperatures, means for throwing said operating means into and out of operation, and temperature responsive means for throwing said burner out of operation at a predetermined temperature above said maximum and below the boiling point of the liquid.

18. A heater of the character described, comprising a horizontally elongated fluid tight vessel, means for supplying liquid to be heated thereto to maintain said vessel completely filled therewith, comprising a liquid inlet leading into the bottom of said vessel near one end thereof, a liquid outlet leading from the top of said vessel near the other end thereof, a plurality of conduits for the products of combustion extending lengthwise through said vessel, baffles in said vessel directing said liquid to follow a circuitous path and into engagement with each of said conduits a plurality of times between said inlet and outlet, and a plurality of liquid conduits connected alternately at opposite ends thereof in a single series, one end of said series being connected with said vessel to receive liquid from said liquid outlet, said liquid conduits extending lengthwise within said conduits for the products of combustion, the other end of said series being connected with a heated liquid discharge conduit.

19. A liquid heater, comprising a horizontally elongated fluid tight vessel, a plurality of flues extending longitudinally through said vessel from end to end thereof, a liquid inlet entering through the bottom of said vessel near one end thereof, a liquid outlet leading from the top of said vessel near the other end thereof, a plurality of vertical baffles in said vessel between said inlet and outlet arranged in alternating sets, the baffles of one set extending to the bottom of said vessel and being terminated short of the top thereof, and the baffles of the other set extending to the top of said vessel and terminating short of the bottom thereof, and means for creating a forced circulation of liquid through said vessel from said inlet between each pair of adjacent baffles to said outlet.

20. A liquid heater, comprising a horizontally elongated fluid tight vessel, a plurality of flues extending longitudinally through said vessel from end to end thereof, a liquid inlet entering through the bottom of said vessel near one end thereof, a liquid outlet leading from the top of said vessel near the other end thereof, said vessel being completely filled with liquid, means for directing circulation of liquid through said vessel from said inlet to said outlet in a circuitous path, a continuous circuitous liquid conduit extending from said outlet through all said flues, comprising a length of conduit in each of said flues, and means connecting adjacent lengths alternately at opposite ends of said vessel to carry said liquid back and forth through one flue after another, and means for creating a force circulation of liquid through said vessel from said inlet to said outlet and successively through said lengths of conduit from end to end of said circuitous liquid conduit.

21. A heater of the character described comprising a vessel, means for passing liquid to be heated through said vessel in a circuitous path, comprising liquid circulating means, a combustion chamber, fuel burners in said combustion chamber, means for passing products of combustion from said chamber into heat transfer relation to the contents of said vessel a plurality of times, comprising draft creating means, means for receiving the liquid from said vessel and conducting the same in a circuitous path into heat transfer relation with the gases in the means for passing said products of combustion into heat transfer relation to the contents of said vessel, and temperature responsive means controlling the operation of said burners, said draft creating means and said liquid circulating means.

22. A heater of the character described comprising a vessel, means for passing liquid to be heated through said vessel in a circuitous path, comprising liquid circulating means, a combustion chamber, fuel burners in said combustion chamber, means for passing products of combustion from said chamber into heat transfer relation to the contents of said vessel a plurality of times, comprising draft creating means, means for receiving the liquid from said vessel and conducting the same in a circuitous path into heat transfer relation with the gases in the means for passing said products of combustion into heat transfer relation to the contents of said vessel, and temperature responsive means controlling the operation of said burners, said draft creating means and said liquid circulating means comprising means for operating said burners, draft creating means and fluid circulating means in unison to maintain the temperature of the liquid between predetermined minimum and maximum temperatures much higher than the boiling point of water, means for operating said burners, draft creating means and fluid circulating means in unison to maintain the temperature of the liquid between predetermined minimum and maximum temperatures much lower than said first mentioned temperatures, temperature controlled means for throwing each of said operating means into and out of operation, means for selecting either of said temperature controlled means for controlling said operating means, and means for continuing said draft creating means and said liquid circulating means in operation after said last mentioned operating means has been selected until a predetermined temperature drop in said liquid below said higher minimum has occurred.

23. A heater of the character described comprising a vessel, means for passing liquid to be heated through said vessel, comprising liquid circulating means, a combustion chamber, means for passing products of combustion from said chamber into heat transfer relation to the contents of said vessel, comprising draft creating means, a plurality of temperature responsive means operating over different temperature ranges simultaneously controlling the operation of said draft creating means and said liquid circulating means to circulate said liquid only while said draft is being created, means for selecting one of said temperature responsive controlling means and means for receiving the liquid from said vessel and conducting the same in a circuitous path into heat transfer relation with the products of combustion.

24. A heater of the character described comprising a vessel, means for passing liquid to be heated through said vessel, comprising liquid circulating means, a combustion chamber, fuel burners in said combustion chamber, means for passing products of combustion from said chamber into heat transfer relation to the contents of said vessel, comprising draft creating means, means for receiving the liquid from said vessel and conducting the same in a circuitous path into heat transfer relation with said products of combustion, and temperature responsive means controlling the operation of said burners, said draft creating means and said liquid circulating means, comprising means for operating said burners, draft creating means and fluid circulating means in unison to maintain the temperature of the liquid between predetermined minimum and maximum temperatures, means for throwing said operating means into and out of operation, and means for operating said draft creating means and said liquid circulating means independently of said burners to transfer heat from said combustion chamber to said liquid after throwing said first operating means out of operation.

25. A heater of the character described comprising a vessel, means for passing liquid to be heated through said vessel, comprising liquid circulating means, a combustion chamber, fuel burners in said combustion chamber, means for passing products of combustion from said chamber into heat transfer relation to the contents of said vessel, comprising draft creating means, means for receiving the liquid from said vessel and conducting the same in a circuitous path into heat transfer relation with said products of combustion, and temperature responsive means controlling the operation of said burners, said draft creating means and said liquid circulating means, comprising means for operating said burners, draft creating means and fluid circulating means in unison to maintain the temperature of the liquid between predetermined minimum and maximum temperatures much higher than the boiling point of water, means for operating said burners, draft creating means and fluid circulating means in unison to maintain the temperature of the liquid between predetermined minimum and maximum temperatures much lower than said first mentioned temperatures, temperature controlled means for throwing each of said operating means into and out of operation, and means for selecting either of said temperature controlled means for controlling said operating means.

26. A heater of the character described comprising a vessel, means for passing liquid to be heated through said vessel, comprising liquid circulating means, a combustion chamber, fuel burners in said combustion chamber, means for passing products of combustion from said chamber into heat transfer relation to the contents of said vessel, comprising draft creating means, means for receiving the liquid from said vessel and conducting the same in a circuitous path into heat transfer relation with said products of combustion, and temperature responsive means controlling the operation of said burners, said draft creating means and said liquid circulating means, comprising means for operating said burners, draft creating means and fluid circulating means in unison to maintain the temperature of the liquid between predetermined minimum and maximum temperatures much higher than the boiling point of water, means for operating said burners, draft creating means and fluid circulating means in unison to maintain the temperature of the liquid between predetermined minimum and maximum temperatures much lower than said first mentioned temperatures, temperature controlled means for throwing each of said operating means into and out of operation, means for selecting either of said temperature controlled means for controlling said operating means, and means for operating said draft creating means and said liquid circulating means independently of said burners to transfer heat from said combustion chamber to said liquid after throwing said first operating means out of operation.

27. A liquid heater of the character described, comprising a horizontally elongated tank-like vessel having inlet and outlet connections near opposite ends thereof, a combustion chamber at one end thereof, a chamber at the other end thereof, a lower set of flues extending from said combustion chamber to said other chamber, a stack chamber over said combustion chamber, an upper set of flues connecting said other chamber and said stack chamber, a stack, means for creating a draft in said stack, liquid circulating tubes mounted centrally in the flues of both sets, means connecting one of said liquid circulating tubes with said outlet connection, a discharge pipe, means connecting another of said liquid circulating tubes with said discharge pipe, means connecting all said liquid carrying tubes in a series to carry said liquid back and forth in said flues through said tubes, a pump discharging into said inlet connection to circulate said liquid through said vessel and said tubes, and common temperature responsive controlling means for said pump and draft creating means.

28. In a device of the character described, means for heating a liquid, apparatus heated by said liquid, means for circulating said liquid between said heating means and said apparatus so that said liquid passes from said heating means to said apparatus under a pressure higher than atmospheric and returns from said apparatus at atmospheric pressure, comprising a receiver, a continuously open vent for said receiver comprising a pair of conduits extending upwardly therefrom above the top of said heating means, a receptacle connected with the upper ends of said conduits, and a continuously open vent tube extending from the top of said receptacle, and a pump between said receiver and said heating means.

29. In a device of the character described, means for heating a liquid comprising a heating vessel and a circuitous heating conduit both filled with said liquid, apparatus heated by said liquid, means for circulating said liquid between said heating means and said apparatus so that said liquid passes from said heating means to said apparatus under a pressure higher than atmospheric and returns from said apparatus at atmospheric pressure comprising a vented receiver, a pump between said receiver and said heating means, and an unvented supply line between said heating means and said apparatus.

30. A liquid heater of the character described, comprising a fluid tight vessel, means for supplying liquid to be heated thereto to maintain said vessel completely filled, means for directing said liquid through said vessel in a circuitous path, a plurality of conduits for the products of combustion extending through said vessel, and liquid conduits connected with said vessel to receive liquid therefrom after said liquid has passed through said vessel in said circuitous path, said liquid conduits being connected in series and extending within said conduits for the products of combustion.

31. A liquid heater of the character described, comprising a fluid tight vessel, means for supplying liquid to be heated thereto to maintain said vessel completely filled, a plurality of conduits for the products of combustion extending lengthwise through said vessel from end to end thereof, baffles in said vessel extending alternately from the top and bottom thereof to direct said liquid to follow a circuitous path and into engagement with each of said conduits a plurality of times and a plurality of liquid conduits connected in series, one end of said series being connected with said vessel to receive liquid therefrom after said liquid has passed through said vessel in said circuitous path, said liquid conduits extending lengthwise within all said conduits for the products of combustion.

JOSEPH B. SANDO.